June 5, 1956 W. H. KUHLMAN, JR 2,749,064
AERODYNAMIC DEFLECTOR AND DIFFUSER
Filed Nov. 19, 1952 3 Sheets-Sheet 1
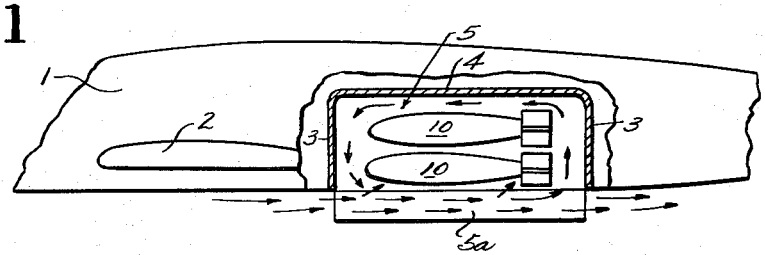
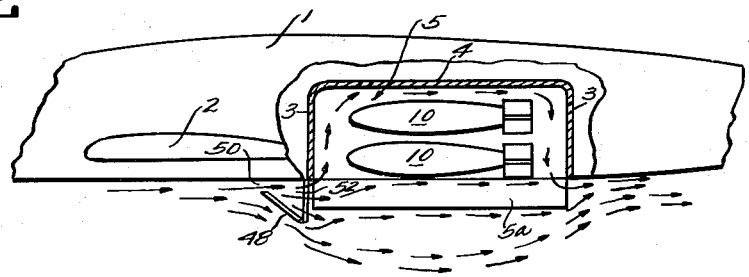
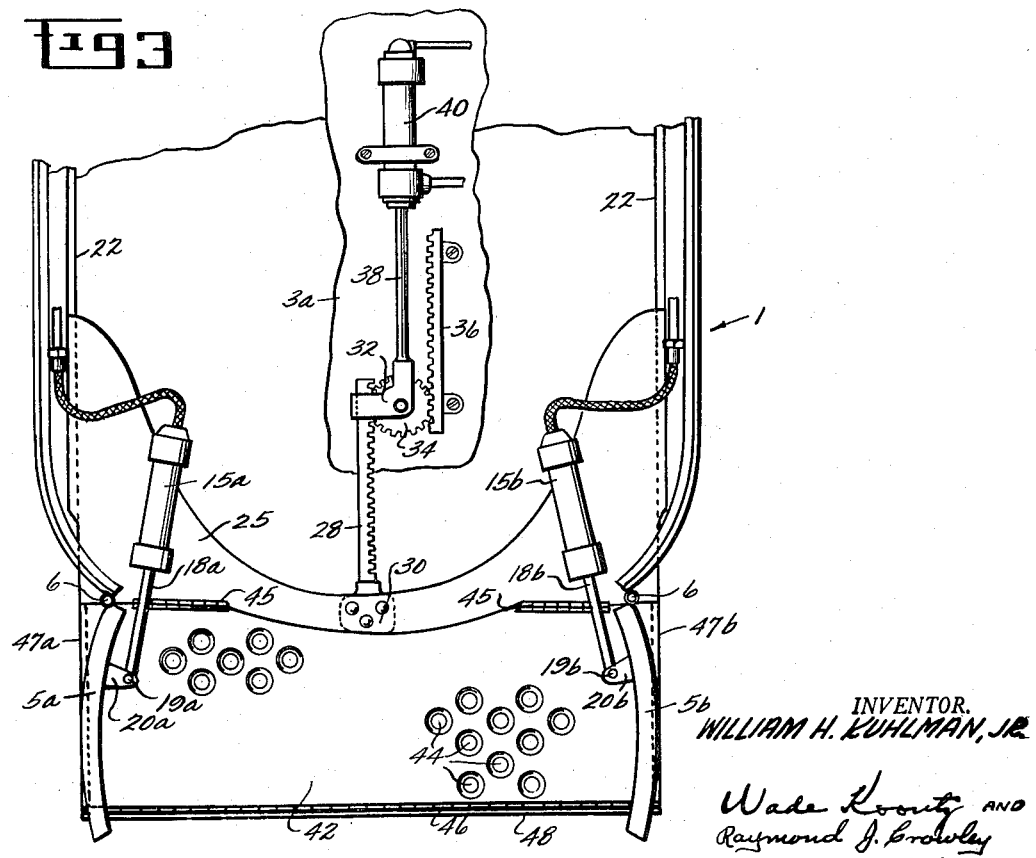
INVENTOR.
WILLIAM H. KUHLMAN, JR.
Wade Koontz AND
Raymond J. Crowley
ATTORNEYS

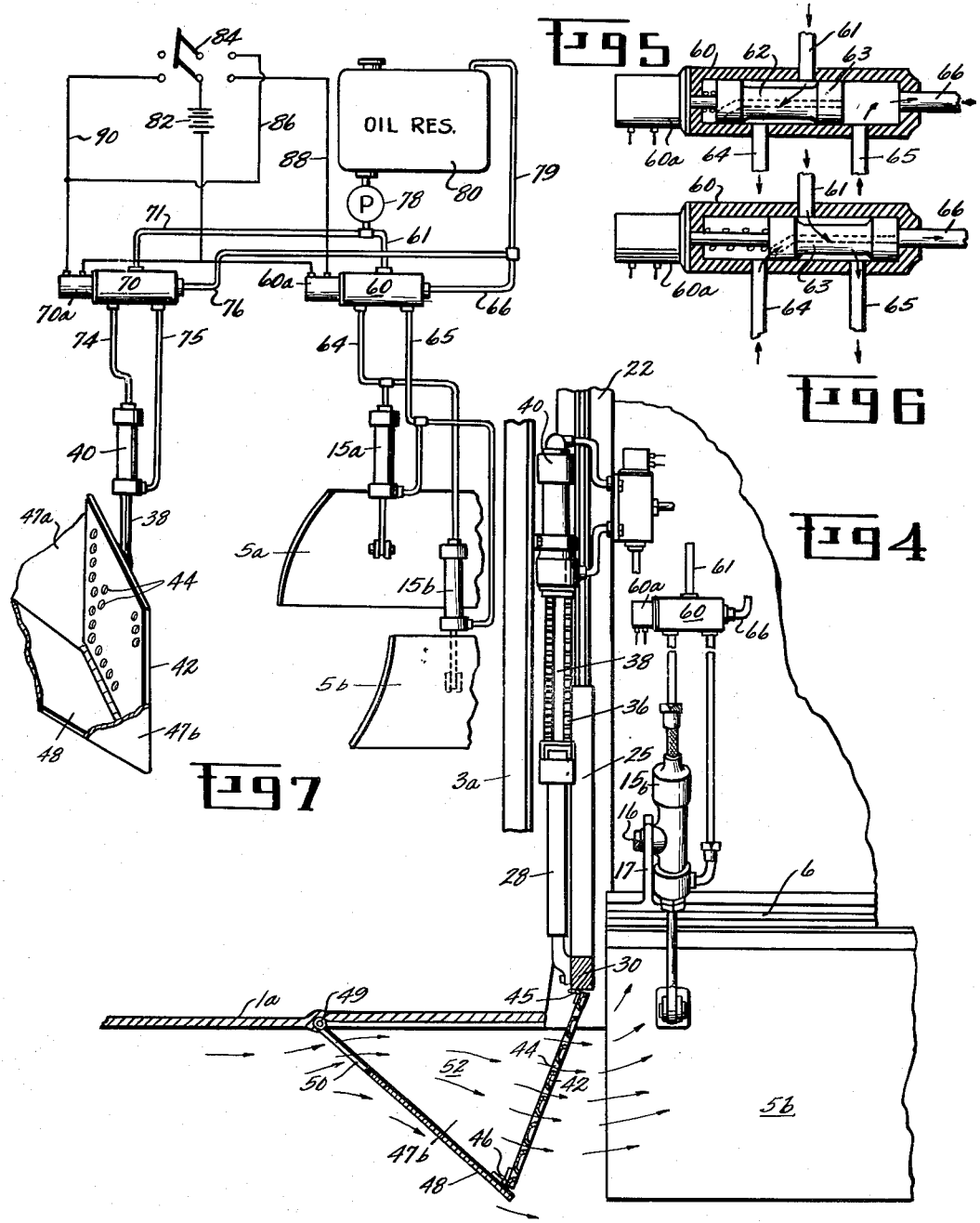

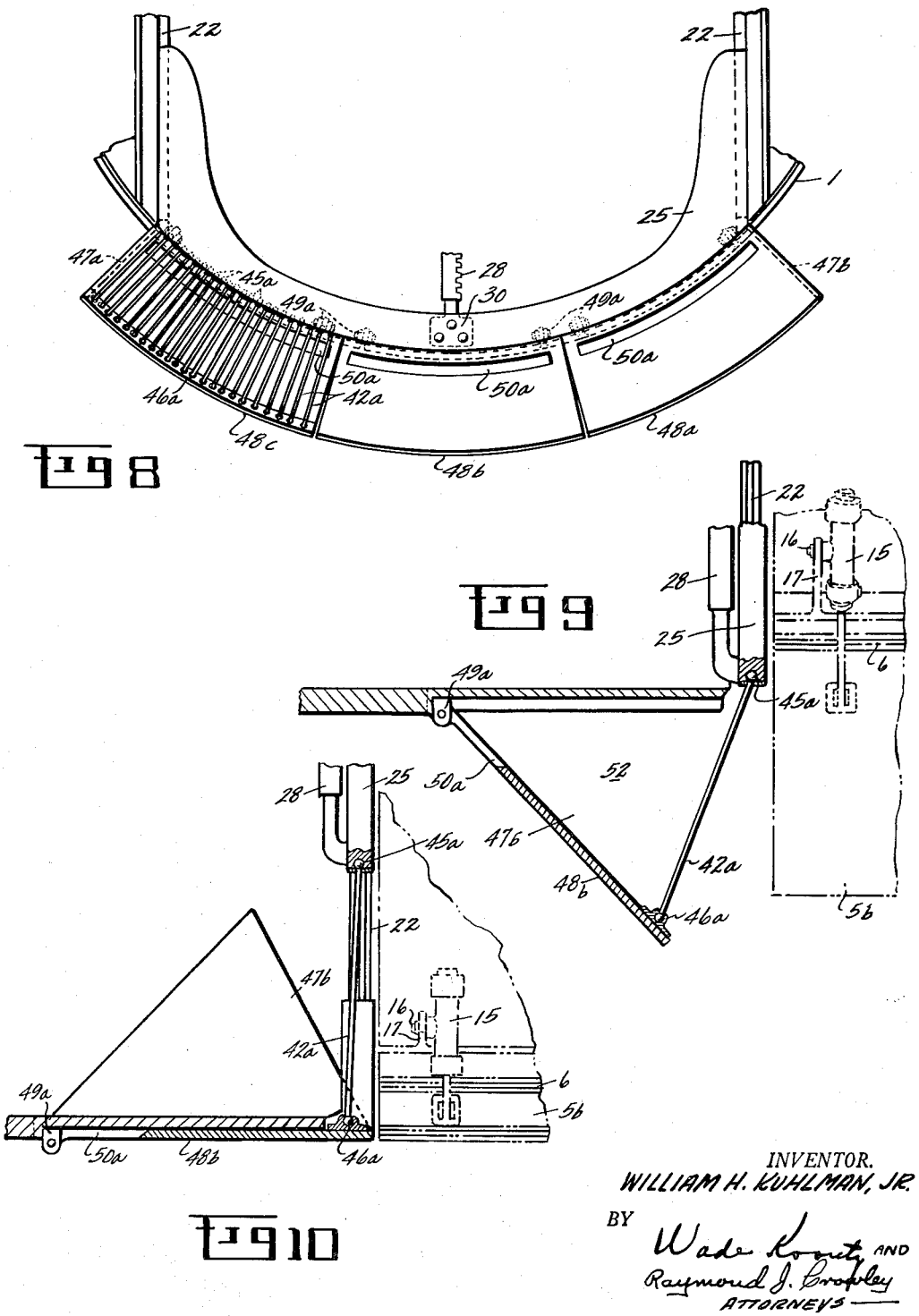

United States Patent Office 2,749,064
Patented June 5, 1956

2,749,064
AERODYNAMIC DEFLECTOR AND DIFFUSER

William H. Kuhlman, Jr., Van Nuys, Calif., assignor to the United States of America as represented by the Secretary of the Air Force Application November 19, 1952, Serial No. 321,530

5 Claims. (Cl. 244—137)

(Granted under Title 35, U. S. Code (1952), sec. 266)

The invention described herein may be manufactured and used by or for the United States Government for governmental purposes without payment to me of any royalty thereon.

The present invention relates to a flow stabilizing and turbulence regulating means for aircraft particularly designed for stabilizing airflow within and in the vicinity of the open bomb bay on high speed bombing aircraft but also useful in providing nonturbulent flow adjacent and within crew escape compartments or in the cockpit area of high speed fighters after release of the canopy and prior to operation of ejection apparatus.

During World War II difficulty was encountered in bombing aircraft when the bomb bays were opened due to buffeting and circulating air currents in the bomb bay. Two remedies have been proposed, one the use of a grid or screen adapted to be positioned immediately forward of the bomb bay to lower the velocity of the air entering the open bomb bay and the second to provide a deflector flap ahead of the bomb bay to divert the air stream away from the bomb bay.

With modern high-speed bombing aircraft opening the bomb bay doors at high subsonic speeds gives rise to a very high amplitude buffeting in the bomb bay which can become severe enough to cause structural failure. In addition a strong circulation occurs in the bomb bay which in conjunction with very high turbulence in the air stream adjacent the bomb bay may cause tumbling of the stores such as bombs, when released. The tumbling effect on bombs makes high accuracy bombing impossible.

Tests conducted with the previous suggested solutions have demonstrated them to be inadequate. The flow controlling grid when exposed to a high subsonic air stream creates an excessive drag and while effective to somewhat reduce the pitching moment on the store when released from the bomb bay is ineffective to reduce buffeting within the bomb bay. The use of a plain flap positioned ahead of the bomb bay reduced buffeting but had little effect on pitching moment on the store.

In accordance with the present invention a flap or deflector surface is pivotally supported on the aircraft forward of its leading edge just ahead of the bomb bay. The flap is provided with actuating means so that it can be retracted flush with the exterior surface of the aircraft or extended so that it is inclined at a positive angle of attack with respect to the air stream. The flap is so constructed that when extended its leading edge is spaced from the aircraft to provide a slot through which a portion of the air stream flows to diffuse in the space between the upper side of the flap and the aircraft so that the velocity of the air flowing through the slot is reduced to a low velocity and higher pressure. To further control turbulence and to aid in diffusion a grid extends from adjacent the trailing edge of the flap across the path of flow of air from the slot. The grid may consist of a stiffened plate with many small apertures, a screen or cellular construction, or may consist of a plurality of closely spaced rods with narrow vertical spaces therebetween.

The exterior or lower surface of the flap serves to deflect the major portion of the air stream so that the velocity of the deflected air stream is increased and the static pressure reduced. Air flowing through the slot is diffused in the space behind the slot and above the deflector before it enters the bomb bay. The diffused air in the bomb bay being at higher static pressure tends to form a cushion over which the high velocity deflected air stream passes with a minimum of turbulence.

The turbulence grid is so connected to the flap that both are extended and retracted together with the actuating mechanism operated in conjunction with the actuating mechanism for the bomb bay doors. The control for the flap can also be arranged for operation of the flap independently as a speed control brake useful in landing approach.

A flap device in accordance with the invention may also be employed in conjunction with crew escape hatches to provide a nonturbulent air stream adjacent the hatch for safe bail out. Similarly the invention is applicable for controlling turbulence adjacent to and within the cockpit of a fighter aircraft after release of the canopy and prior to the operation of an ejection seat.

The scope of the invention will be apparent from the detailed description hereinafter given taken in conjunction with the appended drawings in which:

Fig. 1 is a schematic view, partly in section, illustrating an aircraft provided with a bomb bay without turbulence control means therefor;

Fig. 2 is a schematic illustration similar to Fig. 1 showing the operation of a turbulence control constructed in accordance with the principles of the invention;

Fig. 3 is a rear elevation, partly in section, illustrating the invention;

Fig. 4 is a view similar to Fig. 3 illustrating the invention in side elevation;

Figs. 5 and 6 are schematic illustrations of valve mechanism employed in the invention;

Fig. 7 is a schematic diagram of the control system employed in the invention;

Fig. 8 is a rear elevation, partly in section, illustrating a modified arrangement of a flap mechanism in accordance with the invention;

Fig. 9 is a side elevation, partly in section of the embodiment of the invention illustrated in Fig. 8;

Fig. 10 is a view similar to Fig. 9 showing the flap in the retracted position.

Referring now to Fig. 1, reference numeral 1 generally indicates a fuselage of a high-speed bombing aircraft having a monoplane lifting surface 2. The fuselage is provided interiorly thereof with vertical walls 3 and a top wall member 4 which together generally define a bomb bay compartment illustrated by reference numeral 5. The bomb bay is adapted to be opened on its underside to the air stream by means of bomb bay doors, one of which is indicated by reference numeral 5a, and the doors being adapted to be opened and closed by conventional mechanism, not shown. Within the bomb bay compartment 5 stores such as bombs 10 are mounted and adapted to be released through the bomb bay doors when the latter are opened. An aircraft provided with a bomb bay as thus described is wholly conventional and when the bomb bay is opened and exposed to the relatively moving air stream, as indicated by the arrows, a portion of the air stream is diverted to create a circulating air current also indicated by arrows. The circulation occurring within the bomb bay at high speeds tends to cause the stores to tumble upon release and greatly affect the accuracy of any bombing operation. A further phenomenon arises due to the fact that the air stream in passing over the open bomb bay tends to set up a buffeting or large pressure variation within the bomb bay due to the fact that the bomb bay has properties similar to an organ pipe. The sonic vibrations and large variations in static pressure within the bomb bay give rise to very undesirable vibration in the aircraft and the turbulence of the air stream in the vicinity of the bomb bay becomes excessive. The problem presented in a conventional bombing aircraft with open bomb bay has been clearly recognized by the prior art, for example, in the U. S. Patent 2,451,479 granted to Walter S. Diehl on October 19, 1948, in which it was proposed to employ a flow controlling screen adapted to be dropped below the fuselage at the forward end of the bomb bay so as to stabilize the air flow into the bomb bay. It is also known to employ flaps or deflectors immediately forward of the bomb bay to direct the air stream over the open bomb bay. As previously discussed above each of these suggested remedies has been found to be inadequate when applied to bombing aircraft capable of reaching high subsonic speeds at high altitude for the reason that a flow controlling grid inherently has a very high aerodynamic resistance, and while it will reduce the circulation within the bomb bay it is of little help so far as the buffetting is concerned and a deflector plate positioned forward of the bomb bay will reduce buffeting but has little or no effect upon the pitching moment exerted on the store in the bomb bay when the store is released.

In accordance with the present invention, as illustrated in Fig. 2, there is provided in addition to the conventional structure disclosed in Fig. 1 a deflector plate or surface 48 positioned immediately forward the bomb bay with the plate being inclined at a positive angle of attack with respect to the air stream with the leading edge spaced from the aircraft so as to form an open slot 50 through which the air stream adjacent the underside of the fuselage can pass and expand into the space 52 behind the deflecting surface thus materially lowering the velocity of the air flow admitted through the slot 50 and increasing the static pressure of air flowing into the bomb bay. There is provided an apertured grid 42 which creates a further slowing down and further diffusing the air flow from the slot and also controlling the turbulence thereof immediately prior to entrance of the slot air flow into the bomb bay compartment 5. By proper adjustment of the width of the slot 50 and the angle of attack of deflector 48 it is possible to reverse the direction of circulation of the air stream within the bomb bay compartment and also to greatly reduce the amplitude of the violent pressure fluctuation within the bomb bay. The main portion of the air stream as indicated is deflected by the surface 48 to pass over entirely the open length of the bomb bay. This deflected air stream of increased velocity and reduced static pressure tends to follow a streamline contour formed by the low velocity air flow within the bomb bay.

Further details of the invention will be apparent by reference to Figs. 3 and 4, and, as seen in these figures, the aircraft fuselage 1 is provided with bomb bay doors 5a and 5b hinged to the fuselage structure at 6 which are adapted to be opened and closed in a conventional manner. The forward wall of the bomb bay is indicated by the reference numeral 3a. On each side of the fuselage, just forward of the bulkhead 3a, conventional hydraulic actuating cylinders 15a and 15b are adapted to be swivelled by means of pivot 16 from bracket 17 secured to the aircraft fuselage. Each cylinder is provided with a piston rod, respectively indicated at 18a and 18b, which is connected by means of a pivot pin 19a and 19b, respectively, to lugs or ears 20a and 20b, respectively, of bomb bay doors 5a and 5b. By admission of hydraulic fluid under pressure to these cylinders through a suitable valve mechanism the bomb bay doors 5a and 5b can be opened and closed in a conventional manner.

The fuselage 1 is provided, just forward of the partition 3a, with vertical guides 22 on which a rigid cross beam 25 is freely slidable. The cross beam 25 is actuated by a rack 28 which is secured to the cross beam as indicated at 30. The rack 28 is slidable in a guide 32 and is adapted to mesh with a gear 34 which in turn meshes with the stationary rack 36 mounted on the forward side of the partition 3a. The gear 34 and guide 32 are adapted to be actuated by the piston rod 38 of a conventional hydraulic jack cylinder 40 such that when the jack piston is moved upward or downward the rack 28 is shifted upward or downward a multiple of the stroke of the piston and similarly moves the cross beam 25 upward and downward exactly in the same manner as the actuating mechanism disclosed in the Diehl Patent 2,451,479 noted above. The cross beam 25 has pivotally connected thereto the turbulence and diffusion plate indicated at 42, the upper pivot joints or hinges being indicated at 45, the plate 42 being provided with a plurality of flanged apertures 44 through which air flow impinging thereon is diffused and the turbulence thereof regulated. The plate 42 is pivotally connected at its lower end as indicated at 46 to the flap 48 which extends transversely of the fuselage with a span equal or slightly greater than the width of the open bomb bay. End plates 47a and 47b are mounted at each end of flap 48 to prevent lateral air flow or spillage. The flap 48 is pivoted to the lower fuselage structure 1a as indicated at 49 and has its leading edge spaced from the aircraft fuselage so as to provide a substantially full span slot or opening 50 therethrough so that the air stream may enter through the slot and diffuse in the space 52 above the flap and forward of the bomb bay.

The air stream as indicated in Fig. 4 in flowing through the slot 50, diffuses in the space 52 greatly reducing its velocity before it impinges on the turbulence controlling grid 42 and after passing through the flow resisting openings 44 of the latter enters the bomb bay at relatively low velocity and with a higher static pressure than in the local air stream. Further the turbulence of the air entering the bomb bay is controlled and the direction of air circulation is from the front of the bomb bay to the rear. The air stream impinging directly on the flap 48 is deflected by the flap over the open length of the bomb bay without entering theerin, aided in spanning the length by the low velocity air stream existing within the bomb bay.

The hydraulic jack cylinders 15a, 15b and 40, Fig. 3, are adapted to be controlled by means of identical solenoid actuated reversing valves 60 and 70. These valves are so constructed that they may be simultaneously energized to permit the flow of hydraulic fluid to the jack cylinders 15a and 15b of Fig. 3 so as to open the bomb bay doors and simultaneously admit hydraulic fluid to the hydraulic cylinder 40 for causing the cross beam 25 to be moved downward on the vertical slides 22 of Fig. 3. This will move the turbulence screen 42 downward and through the pivotal connections 45 and 46 cause the flap 48 with end plates 47a and 47b to be lowered from the retracted position into the air stream to serve its proper function while the bomb bay doors are open. When the bomb bay doors are desired to be closed the flow of hydraulic fluid to the jack cylinders 15a and 15b and 40 is reversed and the bomb bay doors are closed and simultaneously the screen 42 and flap 48 are retracted until the flap is flush with the bottom of the fuselage.

The typical solenoid reversing valve 60 is shown in Figs. 5 and 6 in which the valve casing is provided in an interior bore thereof with a conventional spool type reversing valve adapted to be shifted in one direction by the electrical solenoid 60a and to be normally spring urged in the opposite direction. As noted in Fig. 5 fluid entering the valve under high pressure from inlet pipe 61 may be directed through the outlet pipe 64 to actuate the jack cylinders 15a and 15b to open the bomb bay doors. Returned fluid through conduit 65 flows through the valve to a drain pipe 66. In Fig. 6 the valve is shown in its reversed position reversing the flow of fluid from inlet pipe 61 to conduit 65 with return flow through conduit 64 which passes through the central drain passage 63 in the valve spool to the drain pipe 66. This type of fluid reversing valve is old in the art and is conventional in all respects and it will be noted that the valve is normally spring urged in a direction so as to supply fluid pressure to the jack cylinder to cause the same to retract the bomb bay doors and the flap mechanism and turbulent screen respectively so that any electrical failure causes the valve to fail safe. As seen in Fig. 7 the jack cylinders 15a and 15b for actuating the bomb bay doors 5a and 5b are fed in parallel from conduit 64 connected to control valve 60 to admit the fluid to the upper sides of the jack cylinders for opening the bomb bay doors, and similarly conduit 65 serves as a common return, during this operation when the valve 60 is moved in the reverse position fluid under pressure is admitted to the cylinders 15a and 15b to close the bomb bay doors. Inlet conduit 61 is connected to a high pressure source such as pump 78.

The solenoid control valve 70 which is identical in construction to the control valve 60 is actuated by a solenoid 70a and receives high pressure fluid by means of conduit 71 which is parallelly connected to conduit 61 and delivers fluid alternately to the conduit 74 or conduit 75 which are connected to the jack cylinder 40. Drain conduit 76 is connected parallel to drain conduits 66 of valve 60, both of which are connected to a common return line 79. Pressure for the system is derived by means of a motor driven pump 78 from a reservoir 80 to which the oil is returned from conduit 79.

In the control system shown in Fig. 7 a source of electric current such as the battery 82 is provided for energizing control solenoids 60a and 70a, and in one position of the double-pole, double-throw switch 84 current from the solenoids 60a and 70a to simultaneously energize the same so that valves 60 and 70 will simultaneously admit fluid to the door opening jack cylinders 15a and 15b and also to the jack cylinder 40 to simultaneously open the bomb bay doors and to extend the turbulence controlling screen 42 and flap 48. When the switch is moved to the neutral position the valves are urged by their spring controls to reverse the flow of hydraulic fluid from pump 78 to cause the bomb bay doors to be closed and the screen 42 and flap 48 to be retracted. Full size aircraft tests have indicated that a flap in accordance with the present invention creates no more resistance than a conventional speed control flap used on high-speed aircraft and because of its low turbulence the flap in accordance with the invention is also ideal for use independently as a speed brake, for example, during landing. To accomplish this function switch 84 is moved to its other operative position to conduct current by means of conductor 90 from battery 82 only to solenoid 70a causing the flap to be lowered without operating the bomb bay doors. It will be noted that both solenoids 60a and 70a are connected in a common return to the battery 82.

Flight tests of structure in accordance with the present invention have indicated that the pressure fluctuations within the open bomb bay have been reduced to a negligible amount and further that the flow of air within the bomb bay is completely reversed from that appearing in a conventional bombing aircraft when the bomb bay doors are open. Further, the velocity of circulation within the bomb bay is reduced in magnitude so that very little if any pitching moment is exerted upon any stores such as bombs positioned in the bomb bay thus making it possible for the bomb to be dropped and remain in a horizontal position. Further the merging of the air flow from the bomb bay with the air stream diverted by the flap 48 is such that very little turbulence is produced which is further an important factor in accurate bombing.

During a landing approach with an aircraft incorporating the present invention it is possible to employ the flap 48 and turbulence controlling screen 42 independently of operation of the bomb bay doors to slow down the aircraft in the same manner as when conventional speed brakes are employed and this dual function of the flap and screen in accordance with the invention eliminates the need for any additional speed control flaps mounted on the fuselage. It is also apparent that the flap and screen construction in accordance with the invention is applicable to aircraft other than bombing aircraft as a speed control device per se.

Where it is intended to apply the invention to aircraft having a pronounced curvature on the under surface of the fuselage it is necessary to employ a modified construction such as illustrated in Figs. 8 and 9 and in this construction the flap 48 is made up of two or more separate portions such as indicated at 48a, 48b and 48c, respectively which are each separately hinged as indicated at 49a and if desired the hinges may be interconnected by universal joints so as to allow the segmented flap to operate similarly to the well-known engine cowl flaps and if desired the flaps may be so made as to slightly overlap, also a well known expedient. End plates 47a and 47b are employed on flap segments 48a and 48c in the same manner as in the device of Figs. 3 and 4. The flap sections 48a, 48b and 48c are respectively connected by means of a plurality of rods 42a, which are closely spaced in parallel relation and universally pivotally connected as at 45a and 46a in Fig. 9 to the cross beam 25. The rods 42a serve the dual function of forming a turbulence controlling and diffusion grid functioning in the same manner as the apertured plate 42 of Figs. 3 and 4 and also serving as a means of transmitting the extension and retraction forces from the jack actuated cross beam 25 to the individual flap segments. Each of the flap segments is provided with apertures 59a which serve as the slot opening for the flap assembly. The flap assembly when extended appears as shown in Fig. 9 and when retracted as shown in Fig. 10. The modified form of the invention illustrated in Figs. 8 to 10 functions in exactly the same manner as the other embodiment of the invention discussed with respect to Figs. 2 to 7, inclusive.

Because a flap and diffusion grid constructed in accordance with the invention gives superior results it may also be employed forward of crew escape hatches on high speed bombing aircraft to control the turbulent air flow which would otherwise be present adjacent and within such hatches when opened which now creates a great hazard for any crew members required to escape from bombing aircraft by such means. The invention is also capable of being applied in a similar manner on aircraft where escape is by way of a releasable canopy and seat ejection means. In this case the control flap structure would be mounted in an inverted arrangement just forward of the canopy and elevated upon release of the canopy to control the air flow within and adjacent the open cockpit to greatly minimize the turbulent air flow which would otherwise be present and which now creates a hazard in the use of ejection seat apparatus. It will be understood that in accordance with the present invention the turbulence controlling and diffusion grid may take a number of forms such as a parallel grid of rods, an apertured plate, or a screen similar to a radiator core, or other equivalent elements may be employed such as disclosed in the Diehl Patent No. 2,451,479 noted above. As employed hereinafter in the claims the term "grid" is to be interpreted as generic to the various forms of grid or screen which are suitable for the intended purpose.

I claim:

1. In an aircraft having a bomb bay and bomb bay doors adapted when open to expose the bomb bay to the relatively moving air stream, a retractible and extensible flap pivotally mounted adjacent its leading edge on the aircraft immediately forward of the bomb bay, said flap when extended being inclined at a positive angle of attack with respect to the relatively moving air stream and deflecting a major portion of the air stream away from the open bomb bay, a slot adjacent the leading edge of the flap for admission of a minor portion of the air stream therethrough to diffuse in the space above the flap, a flow resisting grid pivotally connected at its lower end to the trailing edge of the flap and extending to the forward end of the bomb bay for further reducing the velocity and increasing the static pressure of the air flowing into the open bomb bay, a power actuated extensible and retractible jack mechanism mounted in the aircraft and an operative connection between the upper end of said grid and said jack mechanism whereby said flap and grid may be simultaneously extended into and retracted from an operative position in the air stream forward of the bomb bay.

2. The structure as claimed in claim 1, in which power actuated jack mechanism is also provided for opening and closing the bomb bay doors, a control means for simultaneously energizing each of said jack mechanisms for synchronous operation and said control means being further operative to control the jack mechanism for actuating said flap and grid to extend and retract the same independent of the operation of the bomb bay doors whereby said flap and grid may serve the additional function of a low turbulence aircraft speed control.

3. In an aircraft having a compartment adapted to be opened to the relative moving air stream in flight means for controlling turbulence and buffeting within and adjacent to said compartment comprising an aerodynamic deflector surface adapted to be moved into the air stream immediately forward of the compartment and being inclined at an angle to deflect the air stream from entering the compartment, vertical end walls secured to said deflector surface and together with said deflector surface defining a diffusion chamber having its exit adjacent the forward end of said compartment, a slot adjacent the leading edge of said deflector surface for admitting a portion of the air stream into the entrance of said diffusion chamber for expansion therein to create a relative low velocity air stream to flow into said compartment and means positioned across the exit of said diffusion chamber for further diffusing and for controlling the turbulence of the air flow discharged from said diffusion chamber into said compartment.

4. In an aircraft having a compartment with closure means therefor adapted when opened to expose the compartment to the relative moving air stream in flight, means for controlling turbulence and buffeting within and adjacent to said compartment comprising a retractible aerodynamic deflector surface having a span equal to the width of said compartment and adapted to be moved into the air stream immediately forward of the compartment and being inclined at an angle to deflect the air stream from entering the compartment, vertical end walls secured to said deflector surface and together with said deflector surface defining a diffusion chamber having its exit adjacent the forward end of said compartment, a slot adjacent the leading edge of said deflector surface for admitting a portion of the air stream into the entrance of said diffusion chamber for expansion therein to create a relative low velocity air stream to flow into said compartment, a retractible diffusion and turbulence controlling grid positioned across the exit of said diffusion compartment, power means for actuating the closure means for said compartment, power means for simultaneously extending and retracting said deflector surface and said turbulence controlling grid and control means operable for jointly energizing each of said power means for sychronous operation, said control means being further operable to energize the power means for extending and retracting said deflector surface and said turbulence grid independent of the power means for actuating said closure means whereby said deflector surface and grid may be employed as a low turbulence aerodynamic brake.

5. A low turbulence aerodynamic speed brake for aircraft comprising a flap supported on the aircraft and adapted to be retracted from the air stream or extended therein at an angle of attack to create an aerodynamic drag force, said flap being provided with end plates extending to the aircraft to define a diffusion chamber between the aircraft and the flap, a slot adjacent the leading edge of the flap forming an entrance for a portion of the air stream into the diffusion chamber, a turbulence controlling grid extending across the exit of said diffusion chamber whereby air flowing from said slot through said diffusion chamber and said grid is materially lower in velocity and turbulence than the surrounding air stream, a power actuated jack mechanism mounted within the aircraft, said grid comprising a plurality of thin rods laterally spaced to provide vertically extending flow restricting passage therebetween said rods each being pivotally connected at its upper end to said jack mechanism and pivotally connected at its lower end to said flap adjacent the trailing edge thereof whereby actuation of said jack mechanism provides for simultaneous extension and retraction of said grid and flap.

References Cited in the file of this patent

UNITED STATES PATENTS

| | | |
|---|---|---|
| 2,076,259 | Wright | Apr. 6, 1937 |
| 2,216,111 | Huet | Oct. 1, 1940 |
| 2,243,906 | Huet | June 3, 1941 |
| 2,451,479 | Diehl | Oct. 19, 1948 |
| 2,461,967 | Devlin | Feb. 15, 1949 |

FOREIGN PATENTS

| | | |
|---|---|---|
| 368,727 | Italy | Mar. 1, 1939 |